United States Patent [19]
Deline

[11] 3,787,328
[45] Jan. 22, 1974

[54] METHOD OF REDUCING EMISSION OF POLLUTANTS IN EXHAUST GAS FROM AN INTERNAL COMBUSTION ENGINE AND MATERIAL THEREFOR

[76] Inventor: John W. Deline, 6100 E. Sixth Ave., Denver, Colo. 80220

[22] Filed: July 23, 1971

[21] Appl. No.: 165,495

[52] U.S. Cl. ............................... 252/427, 423/213
[51] Int. Cl. ............................................. B01d 53/34
[58] Field of Search ..... 252/427; 423/213, 212, 214

[56] References Cited
UNITED STATES PATENTS

| | | | |
|---|---|---|---|
| 2,115,973 | 5/1938 | Fleming | 252/427 |
| 1,556,039 | 10/1925 | Shilstone | 252/446 X |
| 3,451,944 | 6/1969 | Finch | 252/421 |
| 805,985 | 11/1905 | McNelly | 252/427 X |
| 1,726,323 | 8/1929 | Steil | 252/427 |
| 1,824,105 | 9/1931 | Truax | 252/427 X |
| 2,498,480 | 2/1950 | Bierlich | 252/427 X |
| 3,199,946 | 8/1965 | Fujita et al | 252/427 X |
| 3,050,935 | 8/1962 | Eastwood | 423/212 X |
| 3,418,070 | 12/1968 | Roth | 423/213 |

Primary Examiner—Patrick P. Garvin
Attorney, Agent, or Firm—Duane C. Burton

[57] ABSTRACT

A method for reducing emission of pollutants in the exhaust gas from an internal combustion engine comprising removing from said exhaust gases a portion of the hydrocarbons contained therein and reducing the amount of carbon monoxide gas contained therein by contacting said hydrocarbons and said carbon monoxide gas with a porous cellulosic material such as rice hulls and ground corn cobs thereby absorbing and adsorbing said hydrocarbons within and upon said rice hulls and using said absorbed and adsorbed hydrocarbons to oxidize the carbon monoxide gas. The process also includes removing from said exhaust gas a portion of those gases contributing to the production of photochemical smog and, also, reducing the amount of carbon monoxide gas by contacting said gases with a chemical activator selected from the group consisting of copper oxide, copper chloride, and compounds of the transitional elements thereby oxidizing said portion of said gases. The cellulosic material may be moistened and a portion thereof is preferably charred.

5 Claims, 2 Drawing Figures

PATENTED JAN 22 1974 3,787,328

METHOD OF REDUCING EMISSION OF POLLUTANTS IN EXHAUST GAS FROM AN INTERNAL COMBUSTION ENGINE AND MATERIAL THEREFOR

BACKGROUND OF THE INVENTION

The exhaust gases from the average automobile and similar internal combustion engines contain a mixture of carbon monoxide, carbon dioxide, unburned or partially burned hydrocarbons, nitrogen, some of the nitrogen oxides and, under certain conditions, portions of unconsumed air. It is reasonably well established that these automobile exhaust gases and similar exhaust gases from other internal combustion engines contribute to the production of smog. In certain urban areas smog is produced in such quantities as to be considered objectionable and potentially harmful. Attempts to control this condition had led to the enactment of legislation which establishes a maximum permissible content of hydrocarbons in escaping automobile exhaust of 275 ppm and a maximum carbon monoxide gas content of 1.5 per cent.

Prior attempts to reduce the unburned hydrocarbon and carbon monoxide gas content in engine exhaust gases have principally been in the form of so-called "afterburners" for direct oxidation of the undesired materials with excess air and/or catalytic converters for catalytically oxidizing the unwanted materials. However, neither of these systems or any combination thereof has proven completely satisfactory under the wide variety of operating conditions which must be met in the course of operation of an automobile or similar engine in normal use. For example, prior art attempts to solve this problem has resulted in devices which are either expensive to manufacture, costly to operate, complex in maintenance and operation, or ineffective in results obtained because of a failure to reduce sufficiently each category of undesired pollutants.

SUMMARY OF THE INVENTION

This invention relates to a process for reducing the emission of pollutants in the exhaust gas from an internal combustion engine involving the removal from said exhaust gases of a portion of the hydrocarbon and the carbon monoxide gas contained therein by contacting said hydrocarbons and said carbon monoxide gas with a cellulosic material thereby absorbing and adsorbing said hydrocarbons within and upon said cellulosic material and using said abosrbed and adsorbed hydrocarbons to oxidize the carbon monoxide gas. The process of this invention also includes removing from the exhaust gas of an internal combustion engine a portion of those gases contributing to the production of photochemical smog and reducing the amount of carbon monoxide gas contained in said exhaust gas by contacting said gases with a chemical activator selected from the group consisting of copper oxide, copper chloride and compounds of the transitional elements thereby oxidizing said gases. This invention also relates to a filler for use in an internal combustion engine exhaust filter wherein said filler comprises a mixture of porous cellulosic materials selected from the group consisting of rice hulls and ground corn cobs and a chemical activator selected from the group consisting of copper oxide, copper chloride and compounds of the transitional elements. The filler comprises, on a weight percentage basis, about 85 per cent or more of said cellulosic material and up to 15 per cent of said chemical activator. The rice hulls included in said cellulosic material are compacted to a density of up to approximately 24 pounds per cubic foot. Approximately 10 to 50 per cent of the cellulosic material is charged. The cellulosic material is preferably moistened.

Accordingly, a principal object of this invention is to provide an improved method and material for use in reducing the emission of pollutants in the exhaust gas from an internal combustion engine.

Another object of this invention is to provide an improved method and material for reducing the emission of pollutants in the exhaust gas from an internal combustion engine for all operating conditions thereof including "start up," idle, operating at normal speeds and deceleration.

Another object of this invention is to provide an inexpensive material for use in an internal combustion engine exhaust filter which is extremely effective in reducing or removing from the exhaust gas of an internal combustion engine hydrocarbons, carbon monoxide gas, and those gases contributing to the production of photochemical smog.

BRIEF DESCRIPTION OF THE DRAWINGS

The above and other objects, features, and advantages of the invention will become apparent from the following description and claims, when read in conjunction with the accompanying drawings wherein:

DESCRIPTION OF THE PREFERRED EMBODIMENT

It is currently estimated that approximately 60 per cent of all air pollution emissions originate from automobiles, trucks, and the like. Of this amount, 55 per cent is associated with the exhaust gases from the engines thereof. The remaining 45 per cent is associated with the crankcase, carburetor vents and fuel tank vents. Thus, approximately one-third of all air pollution emissions originate with the exhaust from internal combustion engines. However, in view of the expected increase in number of automobiles and trucks that will be operated by 1980, it is reasonable to conclude that the portion of air pollutant emission originating from the exhaust gases of internal combustion engines will actually increase with the coming years. Thus, it is recognized that substantial improvement in the overall quality of the air will be achieved by reducing air pollution emissions from the exhaust gases of internal combustion engines. This invention has its primary application in the treatment of exhaust gases from internal combustion engines.

Figure 1:
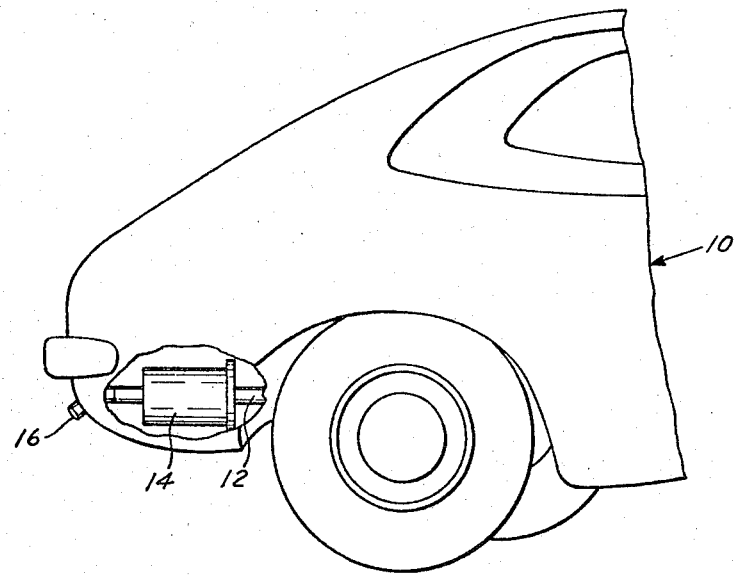
FIG. 1 is a schmatic drawing showing generally the location of an exhaust filter used in accordance with this invention.

In FIG. 1 is shown a schematic illustration of a preferred location of an exhaust filter utilizing a filler material produced in accordance with this invention. More specifically, in FIG. 1 is shown an automobile 10 having an exhaust pipe 12, one end of which is attached in the conventional manner to a muffler (not shown) and the other end of which is attached to a portion of a filter 14, and a tailpipe section 16 which extends rearwardly of the filter 14. As shown, the tailpipe section 16 is not in direct contact with the exhaust pipe 12.

Figure 2:
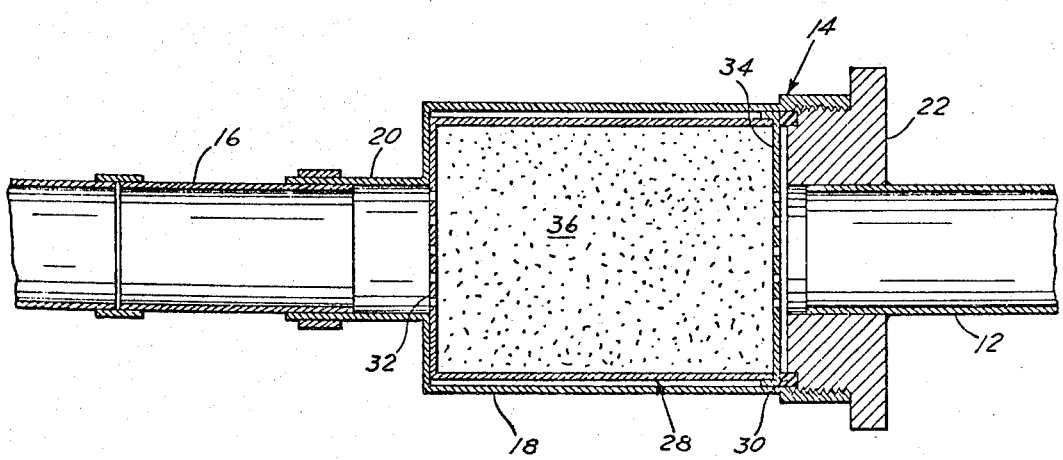
FIG. 2 is an enlarged cross-sectional view of the exhaust filter shown in FIG. 1 and containing the filler material of this invention.

In FIG. 2 is shown an enlarged cross-sectional view of the filter depicted in FIG. 1 above. The filter 14 comprises a cylindrically shaped housing 18 having an outlet portion 20 extending longitudinally from one end thereof. One end of the tailpipe section 16 is mounted within said outlet portion 20. The other end of housing 14 is internally threaded as shown. The filter 14 also includes an annular cap 22 having an externally threaded, tubular portion extending longitudinally from one face thereof. The annular cap 22 is securely attached to the exhaust pipe 12 in any suitable manner such as by welding. The tubular portion of said cap 22 is disposed in threaded engagement with the threads formed internally on said other end of the housing 14. A container 28 is mounted within the housing 18. A seal 30 insures against leakage of the exhaust gases prior to same passing completely through the container 28.

The container 28 is a tubular member having a wall 32 extending across one end thereof and a cap or lid 34 extending across the other end thereof. The wall 32 and the cap 34 have a plurality of openings disposed generally in alignment with, respectively, the tailpipe section 16 and the exhaust pipe 12 thereby permitting the exhaust gases to flow through the container 28. The container 28 is filled with a filler 36 comprising a cellulosic material porous in nature, such as rice hulls and ground corn cobs, and a chemical activator selected from the group consisting of copper oxide, copper chloride, and compounds of the transitional elements. The cellulosic material is either coated with the chemical activator or impregnated with same, i.e., the recesses or openings formed in the surface portions of the cellulosic material receives and traps therein the chemical activator when and since improved results are obtained by increasing the amount of available surface area, it will be appreciated that the use of a porous material which has been compacted somewhat is preferred.

The results of a number of tests made on different filler compositions under different operating conditions are shown in Table I. From these test results it is concluded that porous cellulosic material such as rice hulls and ground corn cobs are useful in reducing the amount of pollutants found in exhaust gases from internal combustion engines. The corn cobs are ground rather finely, preferably to pass through a 5 mesh screen. Where rice hulls are concerned, it has been found that the compacting of same to increase the density thereof to as much as 24 pounds per cubic foot is preferred for improved operating results. The density of rice hulls in the uncompacted form is approximately 10 to 12 pounds per cubic foot. Further, it appears that the ability of the cellulosic material to absorb hydrocarbon and carbon monoxide gas increases with use. Although the cellulosic material is effective for all operating conditions of the internal combustion engine, it has been found that improved oxidation results are obtained at low temperatures by mixing the cellulosic material with a chemical activator selected from the group consisting of copper oxide, copper chloride and compounds of the transitional elements. With respect to compounds of the transitional elements it will be understood that, from a practical viewpoint, the compounds of iron, cobalt, nickel, chrome and manganese are principally involved.

From the test results set forth in Table I, it was concluded that, following start up of the internal combustion engine and operating at other than idle speeds, beneficial results were obtained by using cellulosic porous cellulsoic material

TABLE II

| Test No. | Car* | Engine speed (r.p.m.) | Cellulosic material | | Chemical activator | | Without filter | | With filter | | Percent reduction in emission | |
|---|---|---|---|---|---|---|---|---|---|---|---|---|
| | | | Type | Amount (gms.) | Charred percent | CuO (gms.) | CuCl (gms.) | HC** (p.p.m.) | CO, percent | HC (p.p.m.) | CO, percent | HC | CO |
| 1 | A | 800 | Rice hulls | 57 | | | | 340 | 5.75 | 310 | 4.75 | 8.8 | 17.4 |
| 2 | A | 800 | do | 34.2 | | | | 340 | 5.75 | 310 | 5.25 | 8.8 | 8.7 |
| 3 | A | 800 | do | 21.4 | | | | 340 | 5.75 | 310 | 5.00 | 8.8 | 13.1 |
| 4 | A | 800 | do | 106 | | | 1 | 340 | 5.75 | 280 | 4.60 | 17.6 | 20.0 |
| 5 | A | 800 | do | 106 | | 1 | | 340 | 5.75 | 270 | 4.60 | 20.6 | 20.0 |
| 6 | A | 800 | do | 120 | | | 1 | 340 | 5.75 | 280 | 4.70 | 17.6 | 19.4 |
| 7 | A | 800 | do | 129 | | 1 | | 340 | 5.75 | 290 | 5.20 | 14.7 | 8.5 |
| 8 | A | 800 | do | 129 | | | | 340 | 5.75 | 280 | 4.70 | 17.6 | 19.4 |
| 9 | A | 800 | do | 106 | | | | 340 | 5.75 | 280 | 4.75 | 17.6 | 17.4 |
| 10 | A | 2,500 | do | 34.2 | | | | 290 | 2.00 | 230 | 1.30 | 20.7 | 35.0 |
| 11 | A | 2,500 | do | 106 | | | | 210 | 1.20 | 152 | 0.72 | 27.6 | 40.0 |
| 12 | B | 800 | do | 106 | | | | 220 | 1.30 | 60 | 0.35 | 72.7 | 73.0 |
| 13 | B | 800 | do | 129 | | 1 | | 220 | 1.30 | 140 | 1.05 | 36.4 | 19.2 |
| 14 | A | 580–600 | do | 143 | | | | 500 | 3.85 | 420 | 3.65 | 16.0 | 5.2 |
| 15 | A | 580–600 | do | 143 | 25 | | | 500 | 3.85 | 500 | 3.80 | 0.0 | 1.3 |
| 16 | A | 580–600 | Ground corn-cobs. | 143 | | | | 500 | 3.85 | 440 | 3.75 | 12.0 | 2.6 |
| 17 | A | 1,000 | Rice hulls | 143 | 25 | | | 260 | 2.70 | 170 | 2.90 | 34.60 | ¹(7.4) |
| 18 | A | 1,000 | do | 143 | | | | 260 | 2.70 | 156 | 2.60 | 36.10 | 3.7 |

¹ Increase.
*A—1969 Camaro, 327 cubic inch engine, test time—10 minutes; B—1969 Ford Station Wagon, 390 cubic inch engine; test time—10 minutes.
**HC=Hydrocarbon.
Container size:
  Test 1—2¼" diameter x 5" long.
  Tests 2–13—3" diameter x 7" long.
  Tests 14–18—4" diameter x 5" long.

used in powder form. A portion of the cellulosic material, preferably approximately 10 to 50 per cent, has been charred before being intermixed with the chemical activator. Where the cellulosic material includes rice hulls, said rice hulls are compacted to a density up to approximately 24 pounds per cubic foot thereby providing an increased quantity of rice hulls and, correspondingly, an increased surface area for contacting the exhaust gases passing through the filler 36. Since the amount of surface area is dependent upon the quantity and porosity of the cellulosic material used in which approximately 10 to 50 per cent thereof had been charred. Although not shown in Table I, it has been found that the use of a moistened cellulosic material performed better than where completely dried cellulosic material was involved. In view of the fact that moisture exists in the exhaust gases from an internal combustion engine and condensation thereof often takes place downstream of the muffler, it is to be expected that during operation of an internal combustion engine sufficient moisture may be available to keep the cellulosic material in a more or less dampened condition.

The cellulosic material may be intermixed with the chemical activator in a number of ways. For example, the cellulosic material and the chemical activator may be permanently intermixed by tumbling same for several hours. It has been found that the desired amount of chemical activator becomes deposited within the recesses naturally occurring in the surfaces of the porous cellulosic material following a tumbling operation for approximately 4 hours. Additionally, the chemical activator may be solubilized in a liquid, sprayed upon the cellulosic material, and then permitted to dry.

In view of the somewhat complex phenomena occuring as the exhaust gases from an internal combustion engine pass through the filler described by this invention, it is recognized that the theory of operation of the filler of this invention may not be completely understood. However, in view of the results that have been obtained, it is believed that the porous cellulosic material treated with a chemical activator either absorbs within the cellulosic material or said chemical activators carbon containing compounds, nitrogen oxide, sulfur dioxide, and solid particles removed from the exhaust gases absorb same on the surface of the cellulosic material. Further, it is also believed that secondary benefits are derived from the use of celulosic materials due to the chemistry of said material which leads to several alternative reactions including oxidation and reduction reactions whereby said material can be utilized in one case as an oxygen supplier and in other cases as a catalytic reducing agent. Where the cellulosic material has been charred or is exposed to elevated temperatures which occur following "warming up" of the internal combustion engine it is believed that the cellulosic material releases its own catalyst to oxidize the carbon monoxide to carbon dioxide. It is also believed that the use of charred cellulosic material is beneficial in assisting the decomposition of partially formed hydrocarbons such as ketones, acids, and aldehydes.

With respect to rice hulls, the reported chemistry thereof is shown in Table II.

Based upon an examination of the constituents of rice hulls, it is noted that with the exception of the ash, which is predominantly silica ($S_1O_2$), the chemical composition of rice hulls is similar to that of wood and its derivatives such as corn cobs. Each of these items contain a fairly high amount of organic extractive matter and a proportionate amount of resinous matter. Rice hulls, in particular, have exhibited a high proportion of resin content in relation to the available organic extractive material such as pentosons from which a varied selection of organic derivatives are derived. Consequently, it is believed that the high proportion of resin content in rice hulls is beneficial since it acts in the absorption and adsorption phenomena described above. Further,

TABLE II

CHEMICAL COMPOSITION OF RICE HULLS
RICE HULLS

| INGREDIENT | % COMPOSITION BY WEIGHT |
|---|---|
| Moisture | 2.4 – 11.0 |
| Ash | 15.7 – 21.3 |
| Protein | 2.4 – 3.6 |
| Ether Extract | 0.9 – 1.2 |
| Crude Fiber | 39.0 – 45.7 |
| Nitrogen Free Extract | 24.7 – 29.4 |

RICE HULL ASH

| | |
|---|---|
| Silica | 94.0 – 94.5 |
| CuO | 0.3 – 2.3 |
| MgO | 0.2 |
| $K_2O$ | 1.1 – 3.2 |
| $Na_2O$ | 0.8 |
| $Fe_2O_3$ | Trace to 0.1 |
| $SO_3$ | 1.1 |
| $P_2O_5$ | 0.5 |
| Al and Mn oxides | Trace | it is believed that the chemical activity occurring, where rice hulls are involved is responsible for producing organic extractive matter in the presence of nitrogen and carbon derivatives thereby assisting the rice hulls in serving as a natural chemical absorbent for exhaust emissions.

Perhaps the most damaging of the pollutants found in the exhaust gases from an internal combustion engine are the oxides of nitrogen which are responsible for producing photochemical smog. Although no direct data was obtained from the tests results reported herein, since the existence of those conditions required to reduce carbon monoxide gas also reduce the amount of those gases producing photochemical smog, it is believed that the oxides of nitrogen, such as $NO_2$, $N_2O$, and NO, react with the hydrocarbons absorbed by the cellulosic material to form products which are not harmful from an air pollution viewpoint, i.e., nitrates, amines, amides and oxygen nitrates.

With respect to the chemical activator, it has been found that the same may be readily used in the invention in the form of powder, preferably ground to pass a 375 mesh screen.

From the foregoing, it will be readily appreciated that an improved method and material for reducing emission of pollutants in the exhaust gas from an internal combustion engine has been described. The use of a porous, cellulosic material such as rice hulls and ground corn cobs renders for use for automobiles and trucks a quick change, chemisorbic filter device that can be readily mounted on the tailpipes of vehicles to absorb and adsorb undesirable pollutants contained in the exhaust gas from an internal combustion engine, while, at the same time, is inexpensive to use. It is anticipated that the filler material contained within the exhaust filter will be replaced periodically to insure best results in removing undesirable pollutants from the exhaust gas. Due to the ready availability of rice hulls in extremely large quantities, it is believed that the filler material may be changed with each tank of gas for a very slight cost. One of the reasons contributing to the small expense involved is due to the fact that only a few ounces of cellulosic material is required to fill the container 28 as contemplated to be used in the FIG. 2.

Although this preferred embodiment has been described in particular detail, it will be realized that modifications and alterations may be made therein without departing from the scope and spirit of the invention as set forth in the impending claims. For example, it will be readily appreciated that an exhaust filter may be constructed to contain a reservoir for holding water and suitable means for controlling the supply of water to the cellulosic material contained within the container 28. Further, other resinous materials, including those synthetically derived, may be used to obtain beneficial results particularly those having a resin content of at least approximately 50 per cent or more where said material responds to a surface activator, i.e., a charged particle, sufficiently to attract particulate matter thereto.

I claim:

1. A filler for use in an internal combustion engine exhaust filter, said filler consisting essentially of a dry mixture of rice hulls and a chemical activator coating said hulls and selected from the group consisting of copper oxide, and copper chloride, said filler comprising on a weight percentage basis, at least about 85 per cent of said rice hulls and a minor amount up to about 15 per cent of said chemical activator sufficient to activate said rice hulls, said rice hulls being compacted to a density of approximately 24 pounds per cubic foot.

2. A filler as described in claim 1 in which approximately 10 to 50 per cent of the rice hulls have been charred prior to being mixed with said chemical activator.

3. A filler for use in an internal combustion engine exhaust filter for treating exhaust gases having a temperature less than approximately 450° F., said filler consisting essentially of a dry mixture of rice hulls and a chemical activator selected from the group consisting of copper oxide and copper chloride, said filler comprising, on a weight percentage basis, approximately 95 per cent of rice hulls and approximately 5 percent of said chemical activator, said rice hulls being compacted to a density up to approximately 24 pounds per cubic foot.

4. A filler for use in an internal combustion engine exhuast filter, said filler consisting essentially of a dry mixture of porous cellulosic material selected from the group consisting of rice hulls and ground corn cobs and a chemical activator coating said hulls and selected from the group consisting of copper oxide and copper chloride, said filler comprising, on a weight percentage basis, at least about 85 per cent of said cellulosic material and a minor amount up to about 15 per cent of said chemical activator, the rice hulls of of said cellulosic material being compacted to a density up to 24 pounds per cubic foot.

5. A filler as described in claim 4 in which approximately 10 to 50 per cent of the cellulosic material has been charred prior to being mixed with said chemical activator.

* * * * *

UNITED STATES PATENT OFFICE
CERTIFICATE OF CORRECTION

Patent No. 3,787,328  Dated January 22, 1974

Inventor(s) John W. Deline

It is certified that error appears in the above-identified patent and that said Letters Patent are hereby corrected as shown below:

Column 4, Lines 35 & 36 "cellulosic parous cellulsoic material" should be -- a porous cellulosic material --

Signed and sealed this 5th day of November 1974.

(SEAL)
Attest:

McCOY M. GIBSON JR.
Attesting Officer

C. MARSHALL DANN
Commissioner of Patents